United States Patent [19]
Kaneko

[11] Patent Number: 5,104,098
[45] Date of Patent: Apr. 14, 1992

[54] CYLINDER TYPE AIR DAMPER

[75] Inventor: Yoshio Kaneko, Utsunomiyashi, Japan

[73] Assignee: Nifco, Inc., Yokohama, Japan

[21] Appl. No.: 420,980

[22] Filed: Oct. 13, 1989

[30] Foreign Application Priority Data

Oct. 24, 1988 [JP] Japan .................. 63-137822[U]

[51] Int. Cl.⁵ .............................................. F16F 9/06
[52] U.S. Cl. .................................. 267/64.11; 267/123; 188/322.15
[58] Field of Search ............... 137/513.3, 513.5, 513.7, 137/514.7; 267/64.13, 64.14, 64.15, 64.16, 64.18, 64.22, 64.11, 113, 114, 118, 120, 123, 124, 126, 127; 188/322.15, 280, 281, 282

[56] References Cited

U.S. PATENT DOCUMENTS

| | | | |
|---|---|---|---|
| 3,837,445 | 9/1974 | Pierle | 137/513.7 |
| 4,079,750 | 3/1978 | Ludwig | 137/513.7 |
| 4,323,224 | 4/1982 | Freitag et al. | 267/124 X |
| 4,352,417 | 10/1982 | Stinson | 188/322.15 |
| 4,484,669 | 11/1984 | Kato | 188/322.15 |
| 4,503,951 | 3/1985 | Imaizumi | 188/322.15 |
| 4,569,803 | 2/1986 | Takakura et al. | 267/123 X |
| 4,735,402 | 4/1988 | Davis | 137/513.3 |

FOREIGN PATENT DOCUMENTS

| | | | |
|---|---|---|---|
| 1251116 | 9/1967 | Fed. Rep. of Germany | 137/513.5 |
| 2902055 | 7/1979 | Fed. Rep. of Germany | 267/123 |
| 62-24845 | 6/1987 | Japan. | |
| 63-190946 | 8/1988 | Japan. | |

Primary Examiner—Matthew C. Graham
Attorney, Agent, or Firm—Schwartz & Weinrieb

[57] ABSTRACT

A cylinder type air damper includes a cylinder having at least one rib projecting radially inwardly and extending in the axial direction, a piston inserted for reciprocation within the cylinder and axially dividing the interior of the cylinder into a front compartment and a rear compartment. An exhaust hole axially penetrates the piston and is provided with a valve for blocking the exchange of air between the two compartments in response to an axial movement of the piston in one direction. An orifice also axially penetrates the piston within an area thereof subject to blocking by means of the valve for permitting the exchange of air between the two compartments in response to the axial movement of the piston. A vent duct communicates at one end with the orifice and is open at the other end within an area other than the area subject to blocking by means of the valve.

20 Claims, 7 Drawing Sheets

CYLINDER TYPE AIR DAMPER

BACKGROUND OF THE INVENTION

1. Field of the Invention

This invention relates to a cylinder type air damper and, more particularly, to an air damper for providing a braking force which is variable according to the load applied thereto.

2. Description of the Prior Art

Air dampers of this type generally comprise a cylinder, a piston inserted for reciprocation within the cylinder and axially dividing the interior of the cylinder into front and rear compartments, an orifice axially penetrating the piston for permitting the exchange of air between the two compartments in response to axial movement of the piston, and an exhaust hole axially penetrating the piston and provided with a valve for preventing the exchange of air between the two compartments in response to the axial movement of the piston in one direction, as disclosed in Japanese Utility Model Publication SHO 62-24845, Japanese Utility Model Public Disclosure SHO 63-190946, U.S. Pat. No. 4,796,732 and U.S. Pat. No. 4,856,625.

However, the above prior art air dampers have a problem in that the speed of the piston varies with a change in the load exerted upon the air damper.

Since the orifice diameter is fixed, the piston speed is increased with an increasing load impressed upon the damper. For instance, when this damper is used in connection with a door pivoted downwardly about a shaft disposed at the lower end of the door when it is opened, such as, for example, the door of an automobile glove compartment or the like, such that its braking force is utilized when the door is pivoted downwardly, the load exerted upon the damper increases as the door is pivoted downwardly. Therefore, the door opening speed is initially low and accelerates as the door approaches the end of the opening movement.

OBJECT OF THE INVENTION

One object of the invention is to provide an air damper in which the piston can be moved substantially at a constant speed irrespective of the load impressed upon the damper. In other words, one object of the invention is to provide an air damper which is capable of varying the braking force in a direction tending to cancel or compensate for any load variation.

SUMMARY OF THE INVENTION

To attain the above object of the invention, there is provided a cylinder type air damper which comprises a cylinder, a piston inserted for reciprocation within the cylinder and axially dividing the interior of the cylinder into a front compartment and a rear compartment, an orifice axially penetrating the piston so as to permit an exchange of air between the two compartments in response to an axial movement of the piston, and an exhaust hole axially penetrating the piston and provided with a valve for blocking the exchange of air between the two compartments in response to the axial movement of the piston in one direction, and wherein the orifice is open within a region subject to blockage by means of the valve, and wherein further, a vent duct is provided between the orifice and the valve such that it communicates at one end with the orifice and opens at the other end within a region other than the region subject to blockage by means of the valve, or in which the inner periphery of the cylinder is provided with at least one rib projecting radially inwardly and extending in the axial direction of the piston.

With the air damper having a vent duct, when the speed of the piston tends to increase with increasing load impressed thereon, the valve is forcibly seated and deformed so as to reduce the opening area of the vent duct, thus throttling the air entering the orifice from the vent duct and increasing the braking force. For this reason, the braking force can be varied in a direction tending to cancel or compensate for the load variation. It is thus possible to maintain a substantially constant piston speed.

With the air damper having at least one rib provided upon the inner periphery of the cylinder, a gap is provided between the inner periphery of the cylinder and the outer periphery of the piston at the position of the rib, and this gap constitutes a bypass enabling exchange of air between the two compartments defined by the piston, thus reducing the braking force. It is thus possible, by means of providing the rib within an area of the damper at which the initial piston speed characteristic of the load is small, to increase the piston speed within such area within which the initial piston speed is exhibited. Furthermore, due to the absence of the rib within the final piston speed area where the load becomes large, the braking force is increased. For this reason, it is possible to suppress the tendency for the piston speed to increase with increasing load.

Thus, like the air damper having the vent duct, the braking force can be varied in a direction tending to cancel or compensate for the load variation, and thus it is possible to maintain a substantially constant piston speed.

BRIEF DESCRIPTION OF THE DRAWINGS

The above and other objects and features of the invention will become more apparent from the following detailed description with reference to the accompanying drawings, in which like reference characters designate like or corresponding parts throughout the several views, and wherein.

DETAILED DESCRIPTION OF THE PREFERRED EMBODIMENT

Figure 1:
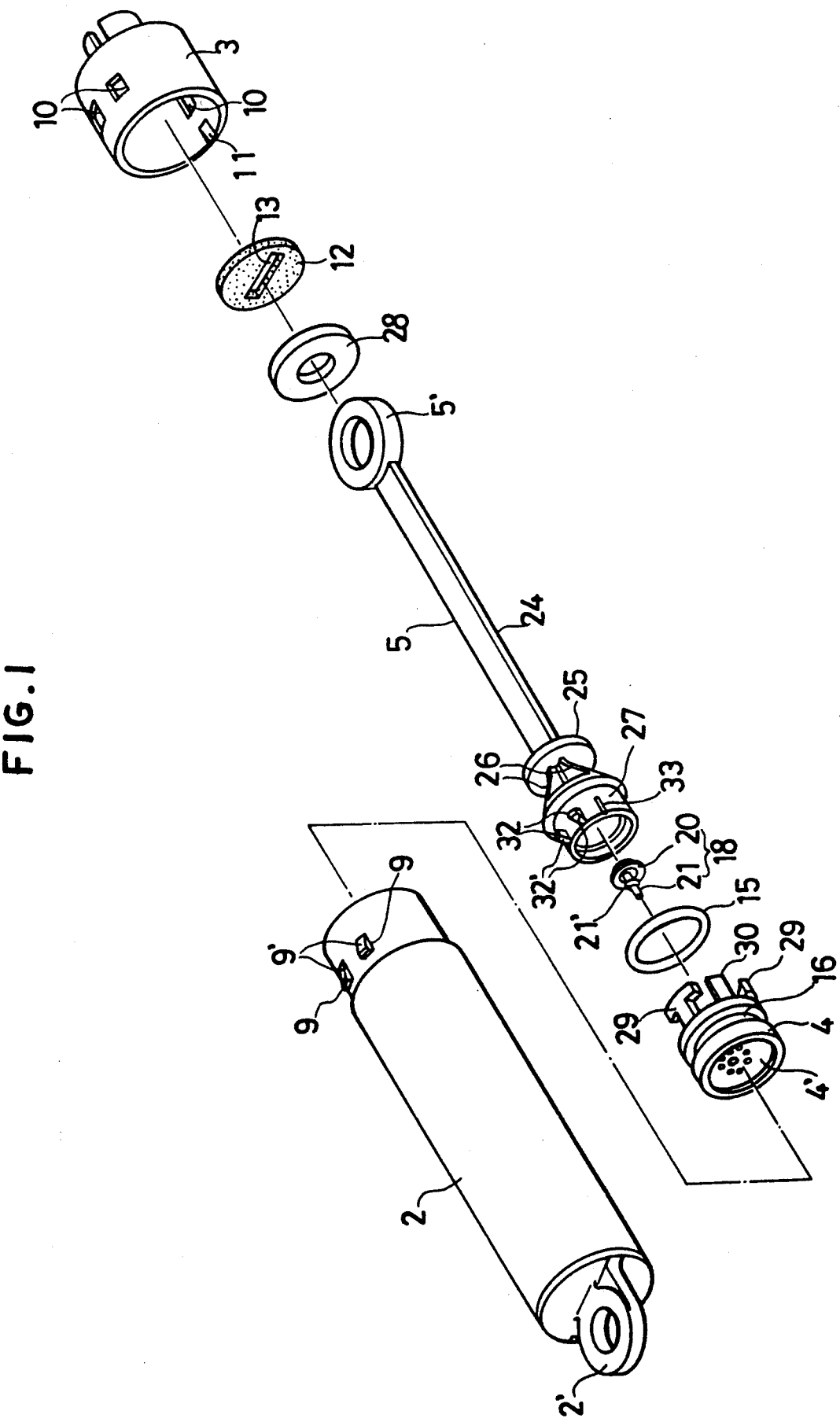
FIG. 1 is an exploded perspective view showing an embodiment of the air damper according to the invention.

The drawings illustrate an embodiment of the cylinder type air damper constructed according to the present invention. In the Figures, reference numeral 1 designates a cylinder type air damper. The air damper 1, as shown in FIG. 1, comprises a cylinder 2 open at one end, a cap 3 closing the open end of the cylinder 2, a piston 4 inserted for reciprocation within the cylinder 2 and axially dividing the interior of the cylinder 2 into front and rear compartments 2a and 2b, and a piston rod 5 extending axially from the piston 4 and penetrating the cap 3 so as to project outside thereof. The individual components are plastic moldings.

Figure 2:
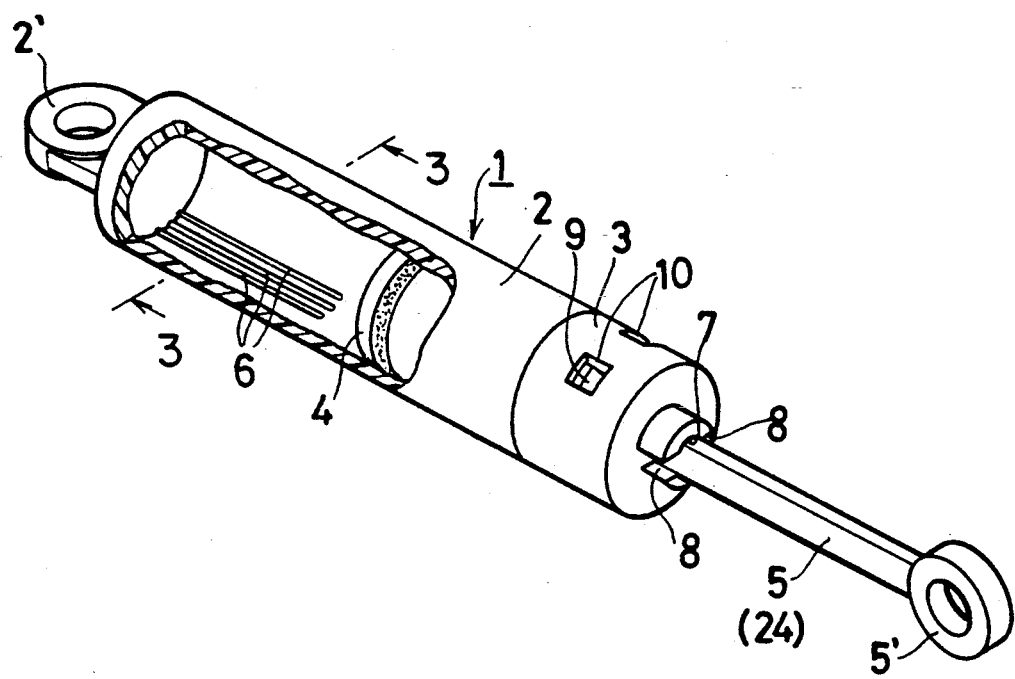
FIG. 2 is a perspective view, partly broken away, showing the cylinder of the air damper shown in FIG. 1.
Figure 3:
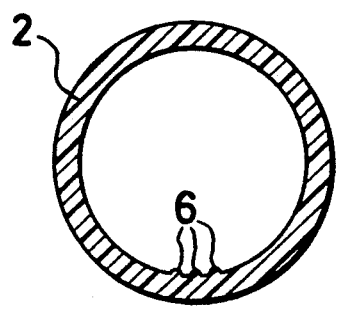
FIG. 3 is a sectional view taken along 3—3 in FIG. 2.

As shown in FIGS. 2 and 3, the cylinder 2 has at least one integral rib 6 projecting radially inwardly and extending in the axial direction of the piston 4. It is molded from, for example, polyoxymethylene and has adequate rigidity and elasticity. In this embodiment, the ribs 6 extend from the inner surface of the blind end wall of the cylinder 2 toward the open end thereof. They extend along the inner periphery of the cylinder 2 for a distance approximately equal to one third of the length of the cylinder. They are parallel and comparatively close to one another. This arrangement of ribs, however, is by no means limitative.

Figure 4:
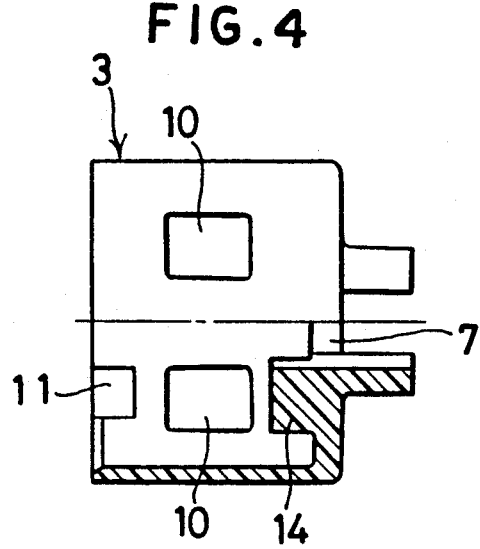
FIG. 4 is a plan view, partly in section, showing the cap of the air damper shown in FIG. 1.
Figure 5:
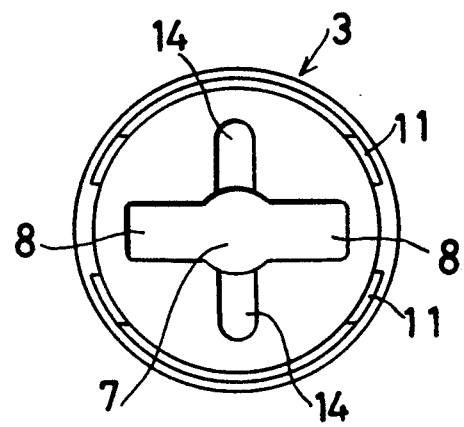
FIG. 5 is a side view showing the cap shown in FIG. 4.

As shown in FIGS. 1, 4 and 5, the cap 3 is cylindrical and is closed at one end. Its end wall has a central circular through hole 7 penetrated by means of the rod 5 and a pair of notches 8 extend diametrically oppositely outwardly from the through hole 7. Similar to the cylinder 2, the cap 3 is made of polyoxymethylene.

The cap 3 and cylinder 2 are provided with respective locking means for engagement with each other. In the illustrated embodiment, the cylinder 2 has its outer periphery near its open end provided with a plurality of, that is, four, integral projections 9 each having a saw-toothed sectional profile with a rearward inclined surface 9', whereas the cap 3 has four engagement holes 10 formed at positions corresponding to the respective projections 9 for receiving the same.

Figure 13:
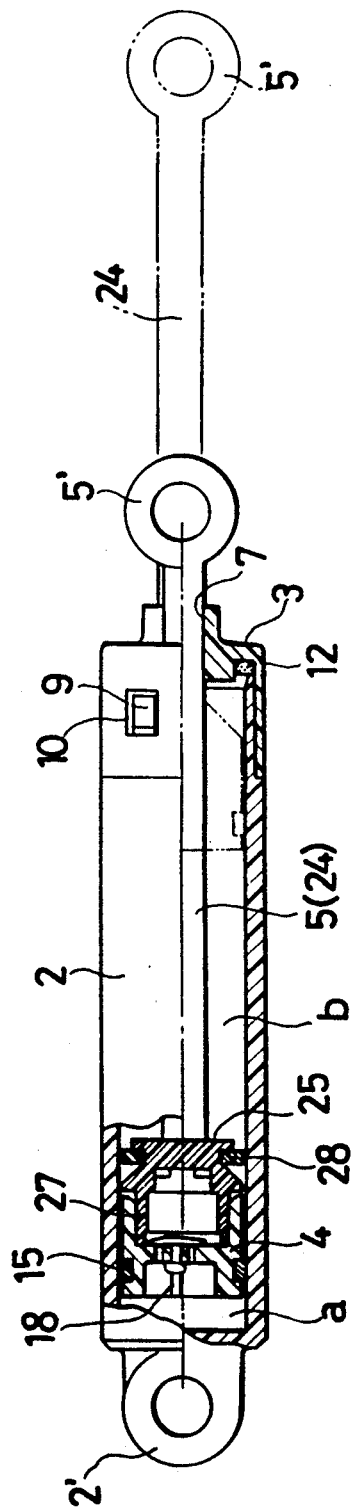
FIG. 13 is a plan view, partly broken away, showing the air damper shown in FIG. 1 in its assembled state.
Figure 15:
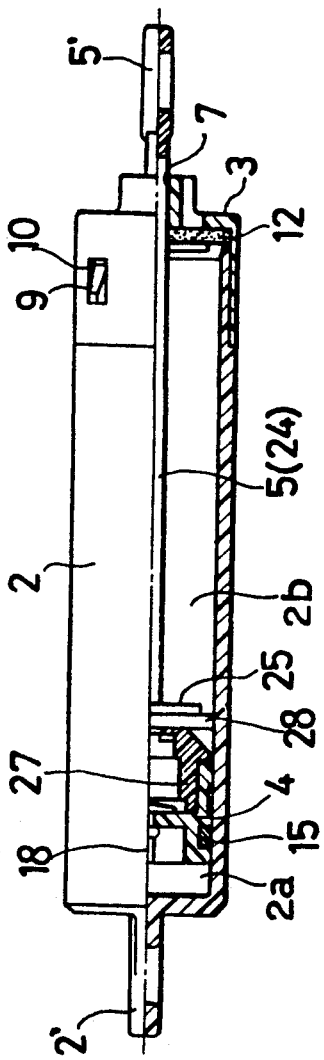
FIG. 15 is a plan view, partly broken away, showing the air damper shown in FIG. 1, with the view being along a line of sight perpendicular to that of FIG. 13.

The projections 9 and engagement holes 10 are provided at non-uniform intervals in the circumferential direction, thus providing for directivity at the time of assembly. The inner periphery of the cap 3 is formed with guide grooves 11 extending axially inward from its open end and tapering toward the respective engagement holes 10. The cylinder 2 and cap 3 have equal outer diameters, and the outer diameter of the portion of the cylinder 2 adjacent to the open end thereof is made slightly less than or substantially equal to the inner diameter of the cap 3, thus preventing formation of a step between the two components as seen in FIGS. 13 and 15.

Between the cap 3 and the cylinder 2, a filter sheet 12 is interposed and fitted within the cap 3 as shown in FIG. 1. This filter sheet 12 serves to filter out dust that may be in the air that is introduced through the gap defined between the cap 3 and the rod 5. It is made from foamed sponge, for example. The filter sheet 12 has a central slot 13 which is penetrated by means of the rod 5. In order to retain the filter sheet 12 upon the inner side of the cap 3, the cap 3 has the inner surface of its end wall formed with a pair of holding portions 14 extending upon the opposite sides of the through hole 7 and disposed within a plane which is perpendicular to that of the notches 8 of the cap 3. The holding portions 14 are fitted within the slot 13 of the filter sheet 12 by slightly increasing the length of the slot 13 by making use of the elasticity of the filter sheet 12, thus securing the filter sheet 12 in the cap 3 (FIGS. 13 and 15).

Figure 6:
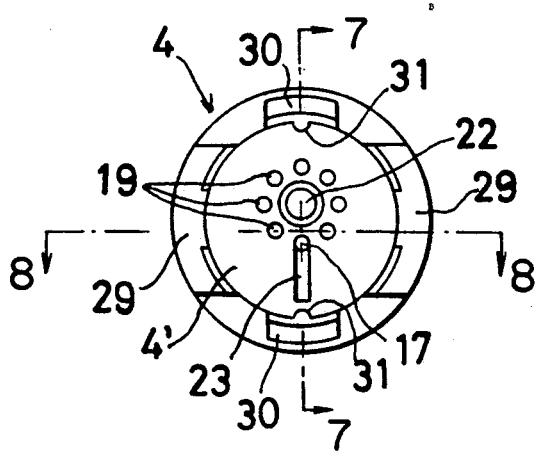
FIG. 6 is a side view showing the piston of the air damper shown in FIG. 1.
Figure 7:
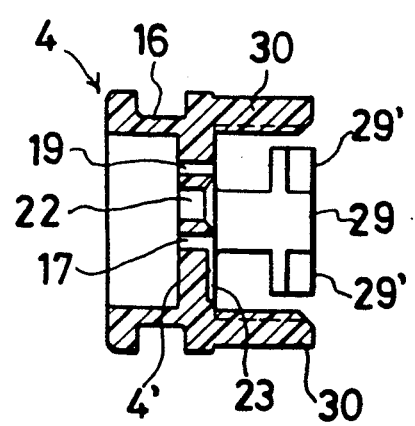
FIG. 7 is a sectional view taken along line 7—7 in FIG. 6.
Figure 8:
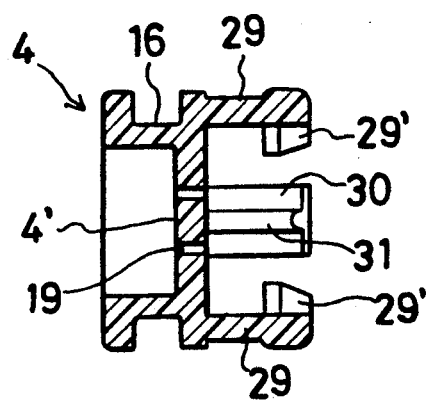
FIG. 8 is a sectional view taken along line 8—8 in FIG. 6.

As shown in FIGS. 6 to 8, the piston 4 is cylindrical and is closed at one end. It is molded from, for example, nylon having adequate rigidity and elasticity. The piston 4 has its outer periphery formed with a ring-like groove 16 in which an O-ring 15 is disposed. The piston 4 has its radial wall 4' formed with an orifice 17 which axially penetrates the wall 4' and permits exchange of air between the two compartments 2a and 2b in response to axial movement of the piston 4, and also with exhaust holes 19 which also axially penetrate the wall 4' and serve to block the exchange of air between the two compartments 2a and 2b in response to axial movement of the piston in one direction. The O-ring 15 is made of silicone rubber (FIG. 1).

Figure 9:
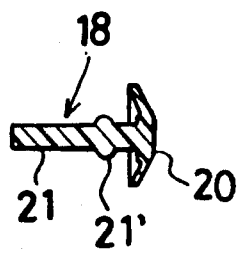
FIG. 9 is a sectional view showing the valve of the air damper shown in FIG. 1.

As shown in FIG. 9, a valve 18 is umbrella-shaped and has a contact portion 20 and a shaft-like portion 21 extending from the center of the contact portion 20 and is formed in a longitudinally intermediate portion with an annularly projecting retaining portion 21'. It is molded from silicon rubber, the hardness of which is higher than that of the O-ring 15, such as, for example, approximately 50. The radial wall 4' of the piston 4 has a comparatively large hole 22 slightly eccentric with respect to its center. The shaft-like portion 21 of the valve 18 is inserted through the hole 22.

As shown in FIG. 6, the orifice 17 and exhaust holes 19 are arranged along a circle concentric with the hole 22. In this embodiment, eight holes are formed such that they inscribe a circle concentric with the hole 22 and within the largest diameter of the contact portion 20 of the valve 18 and each has a diameter of approximately 1 mm. One of these holes constitutes the orifice 17, and the remaining holes constitute the exhaust holes 19. The hole serving as the orifice 17 communicates with a vent groove 23 formed within the wall 4' of the piston 4 upon the side of the wall in contact with the contact portion 20 of the valve 18. The vent groove 23 has one end communicating with the orifice 17 and extends beyond the contact portion 20 of the valve 18. It has a depth of approximately 0.1 mm. The orifice 17 and exhaust holes 19 have a diameter of approximately 1 mm, and similar to the hole 22 they are formed by means of core pins (not shown) at the time of the molding.

Figure 10:
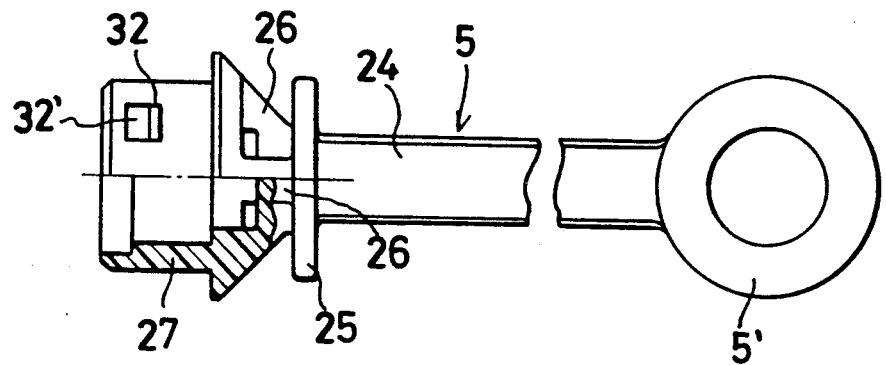
FIG. 10 is a plan view, partly broken away, showing a rod of the air damper shown in FIG. 1.
Figure 11:
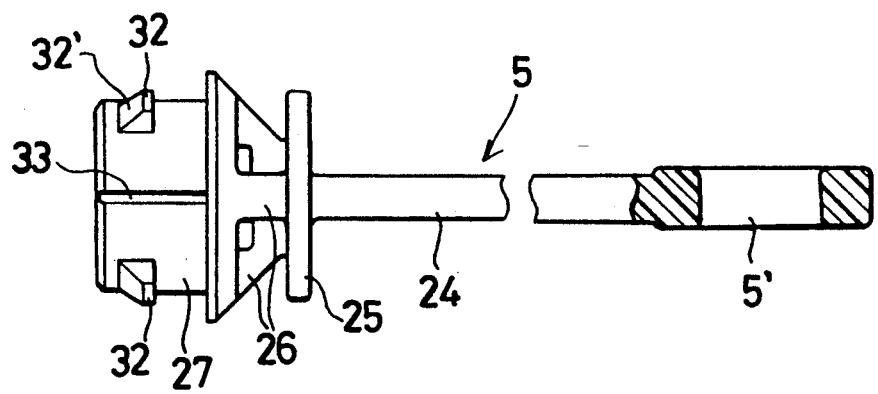
FIG. 11 is the front view showing the rod of FIG. 10.

As shown in FIGS. 10 and 11, the rod 5 has a flat elongate portion 24 integral with a circular portion 25. Circumferentially spaced-apart leg portions 26 extending integrally forwardly and obliquely from the front surface of the circular portion 25 integrally support a cylindrical portion 27 such that it is spaced apart from the front surface of portion 25 as noted above. The rod 5, similar to the piston 4, is molded from nylon. A ring-like sound-proof packing 28 is disposed upon stem portions of the leg portions 26 (FIG. 1). The packing 28 is made of sponge high in elasticity, and its outer diameter is slightly greater than the inner diameter of the cylinder 2.

The piston 4 and rod 5 are provided with coupling means such that they may be coupled to each other. In this embodiment, the piston 4, as shown in FIGS. 1 and 6 to 9, has a pair of T-shaped engaging portions 29 and a pair of straight and wide guide portions 30. These portions 29 and 30 extend integrally and rearwardly from the radial wall 4'. They are arranged such that they exchange alternately along the outer periphery of the cylindrical portion 27 of the rod 5. The two engaging portions 29, as well as the two guide portions 30, diametrically oppose each other. The inner surface of each guide portion 30 is provided with an integral ridge 31 extending in the axial direction of the piston 4. On the other hand as shown in FIGS. 1, 10 and 11, the rod 5 has the outer periphery of its cylindrical portion 27 provided with a pair of integral pawls 32 for engaging the inner side of extensions 29' extending from the opposite sides of the free end portion of each of the engaging portions 29 and is also provided with guide grooves 33 for receiving the ridges 31 of the guide portions 30. Each pawl 32 has a sawtoothed sectional profile and has a front inclined surface 32'.

The procedure for assembling the air damper 1 will now be described

Figure 12:
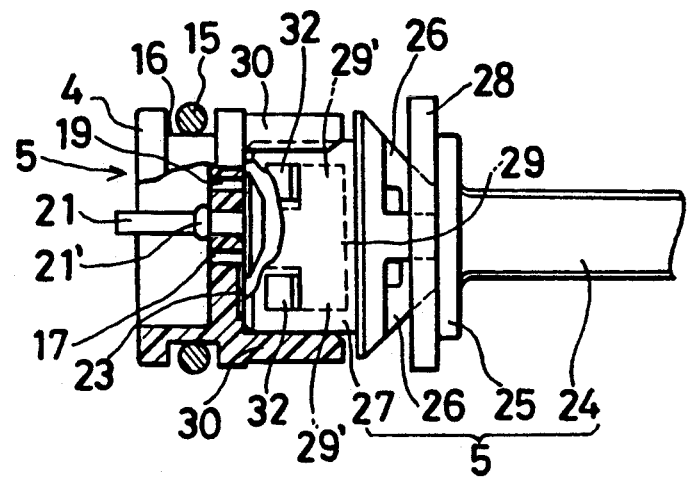
FIG. 12 is a plan view, partly broken away, showing the piston and rod joined together.
Figure 16A:
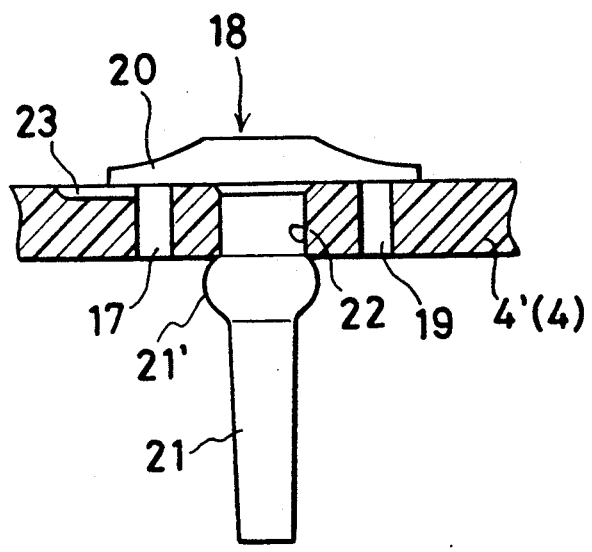
FIG. 16(a) is a sectional view showing the valve of FIG. 9 in an inoperative state.

First, as shown in FIG. 12, O-ring 15 is mounted as a result of its elasticity within the ring-like groove 16 of the piston 4. The shaft-like portion 21 of the valve 18 is inserted rearwardly through the hole 22 of the piston 4, and it is retained within the hole 22 by pulling its retaining portion 21' through the hole 22 as a result of or as permitted by the elasticity of the retaining portion 21' (FIGS. 16(a) and 12).

Meanwhile, as shown in FIG. 12, the sound-proof packing 28 is mounted, as a result of its elasticity, upon the stem portions of the leg portions 26. Since the leg portions 26 extend forwardly and obliquely, and are circumferentially spaced with respect to one another, the sound-proof packing 28 is urged against the front surface of the circular portion 25 of the rod 5.

The piston 4 and rod 5 are coupled to each other by coupling the engaging portions 29 and guide portions 30 of the piston 4 with the pawls 32 and guide grooves 33 provided upon the outer periphery of the cylindrical portion 27 of the rod 5. At this time, the ridges 31 upon the inner surfaces of the guide portions 30 are disposed within the guide grooves 33 formed within the outer periphery of the cylindrical portion 27. When the two components are fitted together, the ends of the engaging portions 29 engage with the pawls 32 upon the outer periphery of the cylindrical portion 27. When the two components are strongly coupled together at this time, the engaging portions 29 are urged radially outwardly by means of the inclined surfaces 32' of the pawls 32 so as to ride upon and clear the pawls 32, whereupon they are restored by means of their elastic restoring forces so as to obtain engagement of the perpendicular rear surfaces of the pawls 32 with the inner surfaces of the extensions 29' of the engaging portions 29. Thus, the engaging portions 29 are retained against withdrawal, and the piston 4 and rod 5 are thus coupled to each other (FIG. 12).

When the piston 4 and the rod 5 are thus coupled together, the flat elongate portion 24 of the rod 5 is inserted from the rear end thereof through the slot 13 of the filter sheet 12, and then the cap 3 is fitted from its open end such that the rod 5 penetrates the hole 7 and notches 8 defined upon the opposite sides of the hole 7. The filter sheet 12 is then moved along the flat elongate portion 24 of the rod 5 so as to be held by means of the holding portions 14 upon the inner surface of the end wall of the cap 3. At this time, the slot 13 of the filter sheet 12 and notches 8 of the cap 3 cross one another. Thus, the notches 8 of the cap 3 are closed by means of the filter sheet 12 so as to prevent intrusion of dust through the notches 8.

Subsequently, the piston 4 is inserted into the cylinder 2 from the open end thereof, and finally the cap 3 is fitted upon the open end of the cylinder 2 by moving it along the flat elongate portion 24 of the rod 5. At this time, the projections 9 upon the outer periphery of the cylinder 2 adjacent to the open end thereof are engaged within the grooves 11 formed within the inner periphery of the cap 3. Since the projections 9 each have the inclined surface 9' and the grooves 11 are tapered, by strongly coupling the two components together, either one or both of the cap 3 and cylinder 2 are slightly curved or flexed. When the projections 9 proceeding along the grooves 11 reach the engagement holes 10, they are engaged within the engagement holes 10 by means of the elastic restoring force of either one or both of the cap 3 and cylinder 2. The cap is thus retained against withdrawal from cylinder 2 (FIGS. 13 and 15).

Figure 14:
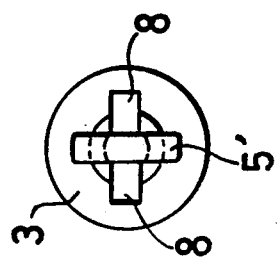
FIG. 14 is a side view showing the air damper shown in FIG. 1.

The flat elongate portion 24 of the rod 5 is passed through the cap 3 and then turned through means of 90 degrees within the circular hole 7 (FIG. 14).

The operation of the air damper 1 thus assembled will now be described. During the elongation stroke of the rod 5, negative pressure is produced within the front compartment 2a of the cylinder 2 and upon the left side of the piston 4. Thus, the contact portion 20 of the valve 18 is brought into close contact with the exhaust holes 19 so as to close all the exhaust holes 19. At this time, the contact portion 20 is also brought into contact with the orifice 17. However, since the vent groove 23 is open beyond the outer periphery of the contact portion 20, the two compartments 2a and 2b are in communication with each other by means of the orifice 17 and vent groove 23 (FIG. 16(a)). For this reason, air within the rear compartment 2b of cylinder 2 and located upon the right side of the piston 4 flows through the orifice 17 and vent groove 23 into the front compartment 2a upon the opposite side of piston 4 and, at this time, it is throttled by means of the orifice 17 and vent groove 23. Thus, braking force is produced during the elongation stroke of the rod 5.

Figure 16B:
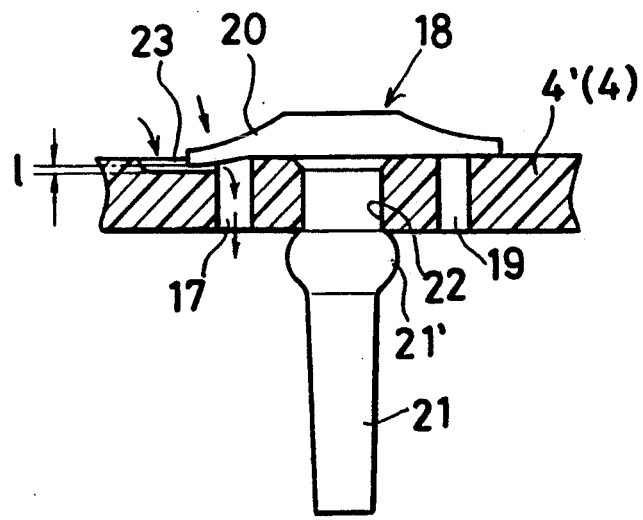
FIG. 16(b) is a sectional view showing the valve of FIG. 9 in an operative state.

The braking force at this time is determined by means of the gap 1 defined between the bottom of the vent groove 23 and the contact portion 20 of the valve 18, the gap varying with the speed of the piston 4. More specifically, during the movement of the piston 4 the pressure of air within the rear compartment 2b of the cylinder 2 causes deformation of the contact portion 20 of the valve 18 such that portion 20 partly enters the vent groove 23 so as to reduce the gap 1 noted above (FIG. 16(b)). Thus, while the load impressed upon the air damper 1 is low, the speed of the piston 4 is comparatively low, and consequently the extent of deformation of the valve 18 is slight. Therefore, the valve 18 enters the vent groove 23 to a slight extent. Thus, the gap noted above is large, and the braking force is comparatively small. When the load is large, on the other hand, the piston 4 tends to be moved quickly, thus increasing the pressure exerted upon the contact portion 20 of the valve 18 and the extent of the deformation of the valve 18. Thus, the valve 18 deeply intrudes into the vent groove 23 so as to reduce the gap 1 and increase the force. This means that the braking force is increased with a corresponding increase of the load. It is thus possible to maintain a substantially constant speed of the piston 4 irrespective of the magnitude of the load.

As shown above, the amount of air flowing into the orifice 17 is determined by means of the gap defined between the valve 18 and the vent groove 23. It is thus possible to provide the orifice 17 with a comparatively large diameter.

Thus, it is possible to form the orifice 17 using a core pin (not shown) during the plastic molding operation. In the illustrated embodiment the diameter of the orifice is predetermined to be 1 mm. However, it is possible to obtain the same orifice effect in the case of an orifice diameter of 0.2 mm or less as a result of the definition of the gap between the valve 18 and the bottom of the vent groove 23.

However, it is very difficult to form the orifice 17 with a diameter of 0.2 mm or less from the outset by using a core pin. This is so because when a very thin core pin is used, it is liable to be bent or broken during the molding operation. For this reason, the lower limit of the orifice diameter is 0.3 mm in the case where a core pin is used. According to the invention, the orifice 17 has a diameter of 1 mm, so that it can be readily formed by using a core pin. Furthermore, the vent groove 23 can be more readily formed than a hole, and is therefore more amenable to high precision machining.

It is possible to form holes after formation of the orifice 17. In this case, an increased number of steps are involved as compared to the case of simultaneous molding, and hence the manufacturing process is correspondingly complicated. In the case of using a drill (not shown) for achieving hole formation, it is difficult to ensure a constant diameter of a very small hole such as, for example, the orifice 17, and thus the rejection factor is high. In the case of using a press, the lower limit of the hole diameter is 0.25 mm. In addition, only shallow holes can be formed. In this case, therefore, the orifice effect is low.

The braking force is variable depending upon the position of the piston 4. More specifically, during the initial stage of the stroke, the O-ring 15 is engaged and elastically deformed by means of the ribs 6 provided upon the inner periphery of the cylinder 2, thus producing a gap between the inner periphery of the cylinder 2 and the outer periphery of O-ring 15 of the piston 4. For this reason, during the initial stage of the stroke of the piston 4 air flows through the gap noted above and into the front compartment 2a of the cylinder 2, whereby the braking force is correspondingly reduced. When the piston is moved to a certain extent, on the other hand, the ribs 6 cease to exist, and the O-ring 15 is restored to its original undeformed state so as to be in close contact with the inner periphery of the cylinder 2 without any gap formed between the two. Thus, only air having passed through the vent groove 23 enters the front compartment 2a through means of the orifice 17, this increasing the braking force. During the initial stage of movement of the piston 4, the piston 4 moves smoothly even though the load is comparatively small.

During the contracting stroke of the rod 5, since the front compartment 2a of the cylinder 2 is in an increased pressure state, the valve 18 opens the orifice 17 and exhaust holes 19, and thus the two compartments 2a and 2b are in communication with each other by means of the orifice 17 and exhaust holes 19 in their fully open state. Air within the front compartment 2a is thus discharged into the opposite side rear compartment 2b through means of the orifice 17 and exhaust holes 19, and no braking force acts upon the movement of the rod 5 in the contracting direction.

During the contracting stroke of the rod 5, noise is liable to be generated by means of the resistance presented to the air flowing through the orifice 17 and exhaust holes 19, and the valve 18 resonates with this noise, thus amplifying it. In order to prevent this noise from occurring due to the valve 18, the point of resonance is shifted by improving the hardness or shape of the valve 18. In addition, in this embodiment air having passed through the orifice 17 and exhaust holes 19 reaches the sound-proof packing 28 after passing through the gaps defined between adjacent leg portions 26 of the rod 5. Thus, noise generated from the orifice 17, exhaust holes 19 and valve 18 is attenuated when the air passes through the packing 28.

In the illustrated embodiment, the piston 4 is molded separately from the rod 5. However, it is possible to form both the piston 4 and rod 5 as a one-piece molding. Furthermore, while in the embodiment described above, the braking force is provided during the elongation stroke of the rod 5, it is possible to provide a braking force during the contraction stroke of the rod 5 by increasing the sealing property of the rear compartment 2b of the cylinder 2 upon the open end side thereof by reversely mounting the valve 18. Furthermore, the number, shape and length of the ribs 6 of the cylinder 2 are not limited to those shown in the above illustrated embodiment. For example, by providing ribs 6 such that their sectional areas are gradually reduced from the blind end side toward the open end side of the cylinder 2, smoother movement of the piston 4 can be obtained. Furthermore, it is possible to perform braking force control depending upon the number and sectional profile of the ribs.

Figure 17:
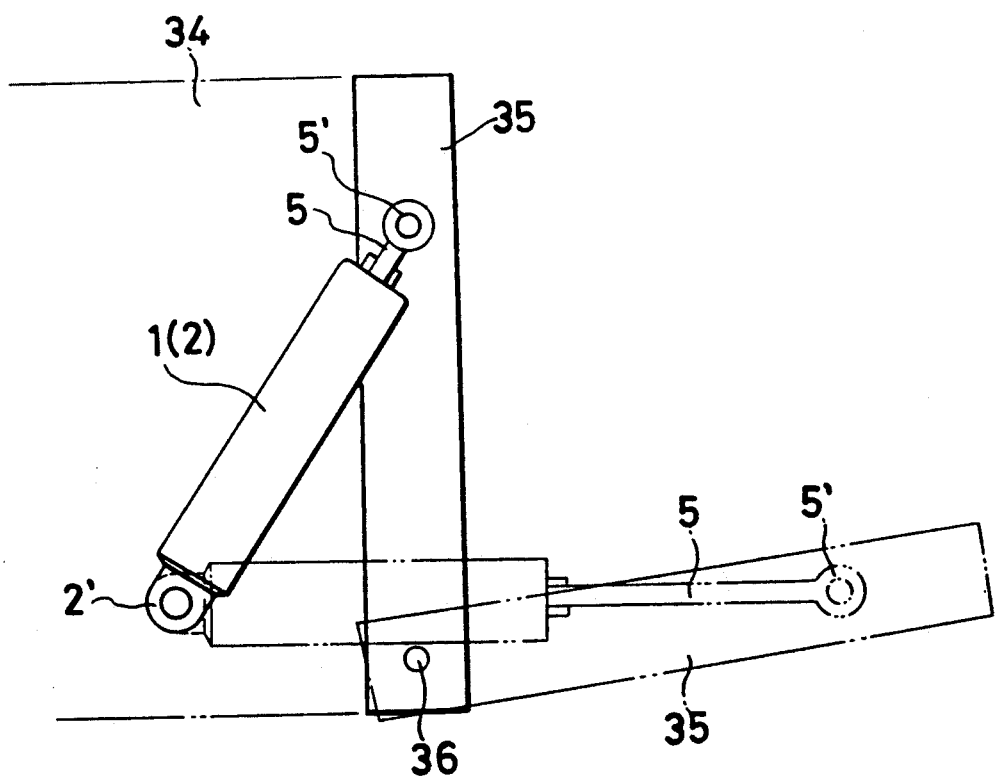
FIG. 17 is an explanatory view showing the air damper of FIG. 1 in use upon a downwardly opening closure.

Now, an example of use of the air damper 1 having the above construction will be described in conjunction with an embodiment illustrated in FIG. 17. In the Figure, reference numeral 34 designated a housing open at least upon the front, and 35 a door for opening and closing the front opening of the housing 34. The door 35 has its lower end hinged at the opening of the housing 34. Thus, when it is opened, it is pivoted downwardly about a shaft 36 at the lower end thereof by means of its own weight. It is locked in its open state by suitable locking means (not shown) capable of being released. The door 35 may be biased in the opening direction by spring means.

The blind end 2' of the cylinder 2 of the air damper 1 is pivoted to a surface of the housing 34, and the rod end 5' is pivoted to a surface of the door 35.

In operation, when the door 35, disposed in the closed state is pivoted downwardly by means of its own weight and is thus opened, the rod is elongated. The air damper 1 thus produces a braking force, and the door 35 opens slowly and quietly (to the state as shown by means of the phantom line in FIG. 17).

At this time, as the door 35 pivots downwardly, the load upon the rod 5 is progressively increased. For this reason, during the initial stage of opening of the door 35 the load is small, but during this stage the braking force is also low due to the ribs 6 provided upon the inner periphery of the cylinder 2. Thus, the piston 4 is moved comparatively quickly despite the small load. When the door 35 has opened to a certain extent, the load on the rod 5 increases. However, since the ribs 6 are not present so as to no longer engage the piston 4 when the latter is at its intermediate stroke position within the cylinder 2, the braking force increases so as to correspondingly reduce the speed of the piston 4.

In addition, along with load increase the gap l defined between the valve 18 and the bottom of the vent groove 23 is gradually reduced so as to gradually increase the braking force.

Thus, a substantially constant speed of the piston 4 can be maintained even with load increase, and the door 35 opens at a substantially constant speed.

When closing the door 35, on the other hand, the rod 5 is contracted, and hence the air damper 1 provides no braking force, and the door 35 can thus be correspondingly closed lightly and quickly.

The air damper 1 may be used not only for a case where the load varies. In this embodiment of the air damper 1, a constant braking force can be obtained except for the initial braking provided that the load is constant. Therefore, it is possible to use the air damper according to the invention for a case where a constant braking force is necessary. Of course in such case the ribs 6 may be omitted. Furthermore, for a case where the load is reduced during an initial braking stage and is otherwise constant, only ribs 6 may be provided, while providing an orifice 17 within an area other than the area subject to closing by means of the valve 18. Furthermore, since the sound-proof packing 28 is provided, the air damper according to the invention is suitable for a case in which noise must be avoided, or for high grade products. The sound-proof packing 28 may of course be omitted in a case where noise may be generated to a certain extent.

As has been described in the foregoing, according to the invention the braking force is varied in a direction tending to cancel or compensate for changes in the load, thus permitting a substantially constant speed of the piston to be maintained.

In addition, with the air damper provided with the vent groove between the orifice and the valve, the amount of air flowing through the orifice is determined by means of the gap defined between the valve and the vent groove, and it is possible to define a comparatively large orifice diameter and permit ready manufacture of the air damper.

Furthermore, with the air damper having the cylinder thereof provided with ribs, the ends of the ribs are in frictional contact with the outer periphery of the piston, and thus it is possible to improve the smoothness of the piston movement.

Obviously, many modifications and variations of the present invention are possible in light of the above teachings. It is therefore to be understood that within the scope of the appended claims, the present invention may be practiced otherwise than as specifically described herein.

What is claimed is:

1. A cylinder type air damper, comprising:
   a cylinder;
   a piston inserted for reciprocation within said cylinder and axially dividing the interior of said cylinder into a front compartment and a rear compartment;
   orifice means axially penetrating said piston so as to permit an exchange of air between said two compartments in response to axial movement of said piston within said cylinder;
   a valve operatively associated with said orifice means for blocking said exchange of air between said two compartments through said orifice means in response to said axial movement of said piston within said cylinder in one direction, said orifice means being disposed within an area subject to said blocking by said valve, and for permitting unobstructed exchange of air between said two compartments when said piston undergoes axial movement within said cylinder in a direction opposite to said one direction; and
   a vent duct being in communication with said orifice means and extending beyond said valve such that said vent duct communicates at one end thereof with said orifice means and opens at the other end thereof within an area other than said area subject to said blocking by said valve so as to permit a throttled exchange of air between said two compartments when said piston undergoes said axial movement in said one direction.

2. An air damper as set forth in claim 1, further comprising:
   a cap lockingly engageable upon an open end of said cylinder, and having an axially located aperture defined within an end wall of said cap for permitting a piston rod of said piston to extend therethrough and outwardly of said cylinder, for substantially closing said open end of said cylinder.

3. An air damper as set forth in claim 2, wherein:
   said open end of said cylinder has a plurality of detents mounted upon an external peripheral surface thereof; and
   said cap has a plurality of apertures defined within a peripheral wall portion thereof for receiving said detents of said cylinder so as to lockingly engage said cap upon said cylinder.

4. An air damper as set forth in claim 2, further comprising:
   filter means disposed interiorly of said cap and interposed between said end wall of said cap and said open end of said cylinder.

5. An air damper as set forth in claim 1, wherein:
   said orifice means comprises a plurality of apertures disposed upon a circular locus about a longitudinal axis of said piston.

6. An air damper as set forth in claim 1, wherein:
   said valve has a substantially T-shaped configuration in cross-section.

7. An air damper as set forth in claim 1, further comprising:
   a piston rod separable from said piston; and
   means for lockingly engaging said piston and said piston rod.

8. An air damper as set forth in claim 7, wherein said means for lockingly engaging said piston and piston rod comprises:
   a plurality of detents mounted upon said piston rod at predetermined first circumferential positions, and a plurality of diametrically opposed guide grooves formed within a peripheral wall portion of said piston rod; and a plurality of substantially T-shaped fingers mounted upon said piston for engaging said plurality of detents upon said piston rod, and a plurality of diametrically opposed guides mounted upon said piston for receptive disposition within said guide grooves of said piston rod.

9. An air damper as set forth in claim 1, wherein:
said vent duct has a predetermined depth defined within said piston so as to control the amount of air flowing therethrough when said piston is moved in said one direction.

10. An air damper as set forth in claim 1, further comprising:
means integrally provided upon said cylinder for mounting said cylinder upon an enclosure; and
means integrally provided upon said piston rod for mounting said piston rod upon a closure pivotably mounted upon said enclosure such that said air damper can dampingly control movements of said closure relative to said enclosure.

11. A cylinder type air damper, comprising:
a cylinder;
a piston inserted for reciprocation within said cylinder and axially dividing the interior of said cylinder into a front compartment and a rear compartment;
orifice means axially penetrating said piston so as to permit an exchange of air between said two compartments in response to axial movement of said piston within said cylinder;
a valve operatively associated with said orifice means for blocking said exchange of air between said two compartments through said orifice means in response to said axial movement of said piston within said cylinder in one direction as a result of said orifice means being disposed within an area of said piston which is subject to said blocking by said valve, and for permitting unobstructed exchange of air between said two compartments when said piston undergoes axial movement within said cylinder in a direction opposite to said one direction;
O-ring means disposed about said piston and in surface contact with an inner peripheral wall surface of said cylinder as said piston reciprocates within said cylinder so as to normally establish a seal between an outer peripheral portion of said piston and said inner peripheral wall surface of said cylinder; and
at least one rib provided upon said inner peripheral wall surface of said cylinder so as to project radially inwardly into said interior of said cylinder and toward said outer peripheral portion of said piston, and so as to extend axially within said cylinder for a predetermined axial length of said cylinder so as to encounter said O-ring means of said piston and radially inwardly deform said O-ring means of said piston in order to break said seal normally established by said O-ring means between said outer peripheral portion of said piston and said inner peripheral wall surface of said cylinder so as to permit an exchange of said air between said two compartments.

12. The air damper according to claim 11, wherein:
said at least one rib extends axially from the inner surface of a blind end of said cylinder.

13. An air damper as set forth in claim 11, wherein:
said at least one rib comprises a plurality of ribs disposed parallel to one another.

14. An air damper as set forth in claim 13, wherein:
said plurality of ribs extend axially within said cylinder for said predetermined length which is approximately one-third of the axial length of said cylinder.

15. An air damper as set forth in claim 11, wherein:
said orifice means comprises a plurality of apertures disposed upon a circular locus about a longitudinal axis of said piston.

16. An air damper as set forth in claim 11, wherein:
said valve has a substantially T-shaped configuration in cross-section.

17. A cylinder type air damper, comprising:
a cylinder;
a piston inserted for reciprocation within said cylinder and axially dividing the interior of said cylinder into a front compartment and a rear compartment;
O-ring means disposed about said piston and in surface contact with an inner peripheral wall surface of said cylinder as said piston reciprocates within said cylinder so as to normally establish a seal between an outer peripheral portion of said piston and said inner peripheral wall surface of said cylinder;
orifice means axially penetrating said piston so as to permit an exchange of air between said two compartments in response to axial movement of said piston within said cylinder;
at least one rib provided upon said inner peripheral wall surface of said cylinder so as to project radially inwardly into said interior of said cylinder and toward said outer peripheral portion of said piston, and so as to extend axially within said cylinder for a predetermined axial length of said cylinder so as to encounter said O-ring means of said piston and radially inwardly deform said O-ring means of said piston in order to break said seal normally established by said O-ring means between said outer peripheral portion of said piston and said inner peripheral wall surface of said cylinder so as to permit an exchange of said air between said two compartments;
a valve operatively associated with said orifice means for blocking said of air between said two compartments in response to said axial movement of said piston within said cylinder in one direction, said orifice means being disposed within an area subject to said blocking by said valve, and for permitting unobstructed exchange of air between said two compartments when said piston undergoes axial movement within said cylinder in a direction opposite to said one direction; and
a vent duct being in communication with said orifice means and extending beyond said valve such that said vent duct communicates at one end thereof with said orifice means and opens at the other end thereof within an area other than said area subject to said blocking by said valve so as to permit a throttled exchange of air between said two compartments when said piston undergoes said axial movement in said one direction.

18. An air damper as set forth in claim 17, wherein:
said orifice means comprises a plurality of apertures disposed upon a circular locus about a longitudinal axis of said piston.

19. An air damper as set forth in claim 17, wherein:
said valve has a substantially T-shaped configuration in cross-section.

20. An air damper as set forth in claim 17, wherein:
said vent duct has a predetermined depth defined within said piston so as to control the amount of air flowing therethrough when said piston is moved in said one direction.

* * * * *